United States Patent [19]

Hirayama

[11] Patent Number: 5,121,210
[45] Date of Patent: Jun. 9, 1992

[54] VIDEO COMPOSING SYSTEM USING SPECIAL EFFECT APPARATUS

[75] Inventor: Keiichi Hirayama, Tokyo, Japan
[73] Assignee: NEC Corporation, Japan
[21] Appl. No.: 604,748
[22] Filed: Oct. 29, 1990

[30] Foreign Application Priority Data

Oct. 27, 1989 [JP] Japan ................. 1-278515

[51] Int. Cl.⁵ ............................................ H04N 5/262
[52] U.S. Cl. ....................... 358/183; 358/27; 395/119; 395/166
[58] Field of Search ............. 358/182, 181, 22 CK, 358/22 PIP, 185, 183; 340/723, 724; 364/521

[56] References Cited

U.S. PATENT DOCUMENTS

| | | | |
|---|---|---|---|
| 4,533,952 | 8/1985 | Norman, III | 358/22 |
| 4,609,993 | 9/1986 | Shimuzu | 364/521 |
| 4,774,507 | 9/1988 | Kashigi et al. | 358/22 |
| 4,831,445 | 5/1989 | Kawabe | 340/724 |
| 4,839,728 | 6/1989 | Casey | 358/22 PIP |
| 4,875,097 | 10/1989 | Jackson | 358/182 |
| 4,907,174 | 3/1990 | Priem | 364/521 |
| 4,947,347 | 8/1990 | Sato | 340/723 |
| 4,954,970 | 9/1990 | Walker et al. | 364/521 |

FOREIGN PATENT DOCUMENTS 0194770 8/1989 Japan .

Primary Examiner—James J. Groody
Assistant Examiner—Jeffrey S. Murrell
Attorney, Agent, or Firm—Ostrolenk, Faber, Gerb & Soffen

[57] ABSTRACT

A video composing system for producing special effects comprising two special effect circuits each of which includes: a video display, a write-in address generator, a read-out address generator responsive to special effect signals, and a depth data generator for generating depth data according to the read operation. Also included is an image mixer for mixing video signals received from the two special effect circuits and a comparator for comparing data received from the two special effect circuits and for producing a control signal based thereon. Taking into consideration the depth parameter produces more naturally appearing video images.

2 Claims, 3 Drawing Sheets

VIDEO COMPOSING SYSTEM USING SPECIAL EFFECT APPARATUS

BACKGROUND OF THE INVENTION

The present invention relates to a special effect apparatus for a video signal which is capable of producing three dimensionally effected video signals, and more particularly to a video composing system which creates a composed image by composing a plurality of three-dimensionally effected video signals delivered from the special effect apparatus.

As is well known, a special effect apparatus produces a three-dimensional effected image, such as image rotation, size expansion, size compression and perspective depth, by writing a digitized video signal into a memory and reading out it with a specially modified read address. An example of such special effect apparatus is disclosed in U.S. Pat. No. 4,831,445, entitled "Special Effect System for Video Signal" which issued May 16, 1989.

In a further variation involving creating a new effect image by composing a plurality of, for example two, effected video signals produced by such a special effect apparatus, video images to be composed overlap each other on a TV screen. In such a case, according to a prior art technique, the order of precedence of the two overlapped images is previously determined and, thus, the video image having priority is displayed in the overlapping area. It is assumed that video images A and B, illustrated in FIGS. 1 (a) and (b), respectively, each having a depth representation (in the Z-direction) by the three-dimensional effect, are composed with priority of the video image A. Though a video image having less depth in the Z-direction should be displayed in the overlapping area notwithstanding the predetermined priority order, the prior art only provides such a composed image as shown in FIG. 2 which does not consider the difference in depth of the overlapping portions. Combining the two video images A and B and taking account of their respective positions in the Z-direction (depth) should give a composed video image shown in FIG. 3, in which a part a of the video image A, having a greater depth than the video image B is hidden behind the video image B. Accordingly, the prior art which selects the video image merely by priority between video image signals to be composed is unable to create an accurate and naturally appearing composed effect, such as is illustrated in FIG. 3.

SUMMARY OF THE INVENTION

An object of the present invention, therefore, is to provide a video composing system using a special effect apparatus which is capable of creating a natural and accurate composed video image by composing three-dimensionally effected video images, taking account of the depth of the effected video images.

According to the present invention, there is provided a video composing system using a special effect apparatus, comprising two special effect apparatus, each including within it a video memory, a write-in address generator, a read-out address generator responsive to special effects and a depth data generator for generating depth (Z-direction) data according to the read operation; an image mixer for composing video signals delivered from the two special effect apparatus; a comparator for comparing depth data obtained from the two special effect apparatus to supply a control signal to the image mixer.

The present invention makes it possible to provide an accurate and natural effect video image because the composition of video image is also controlled by comparing the depth data associated with the video images to be composed.

BRIEF DESCRIPTION OF THE INVENTION

FIGS. 1 (a) and (b) illustrate examples of three-dimensionally effected video images to be composed;

DETAILED DESCRIPTION OF THE PREFERRED EMBODIMENT

Figure 1A:
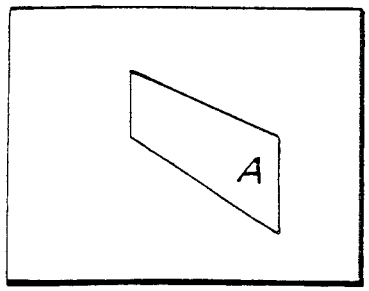
Figure 1B:
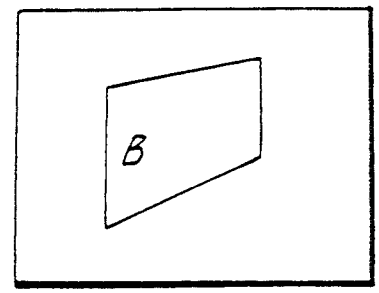
Figure 2:
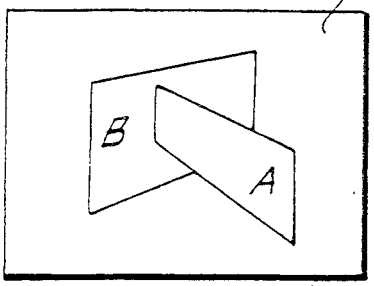
FIG. 2 illustrates a composed video image provided by composing the video images of FIGS. 1 (a) and (b), according to prior art.
Figure 3:
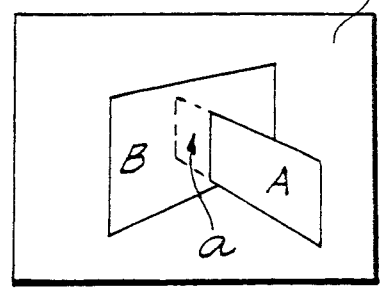
FIG. 3 illustrates a composed video image provided by composing the video images of FIGS. 1 (a) and (b) according to the present invention.
Figure 4:
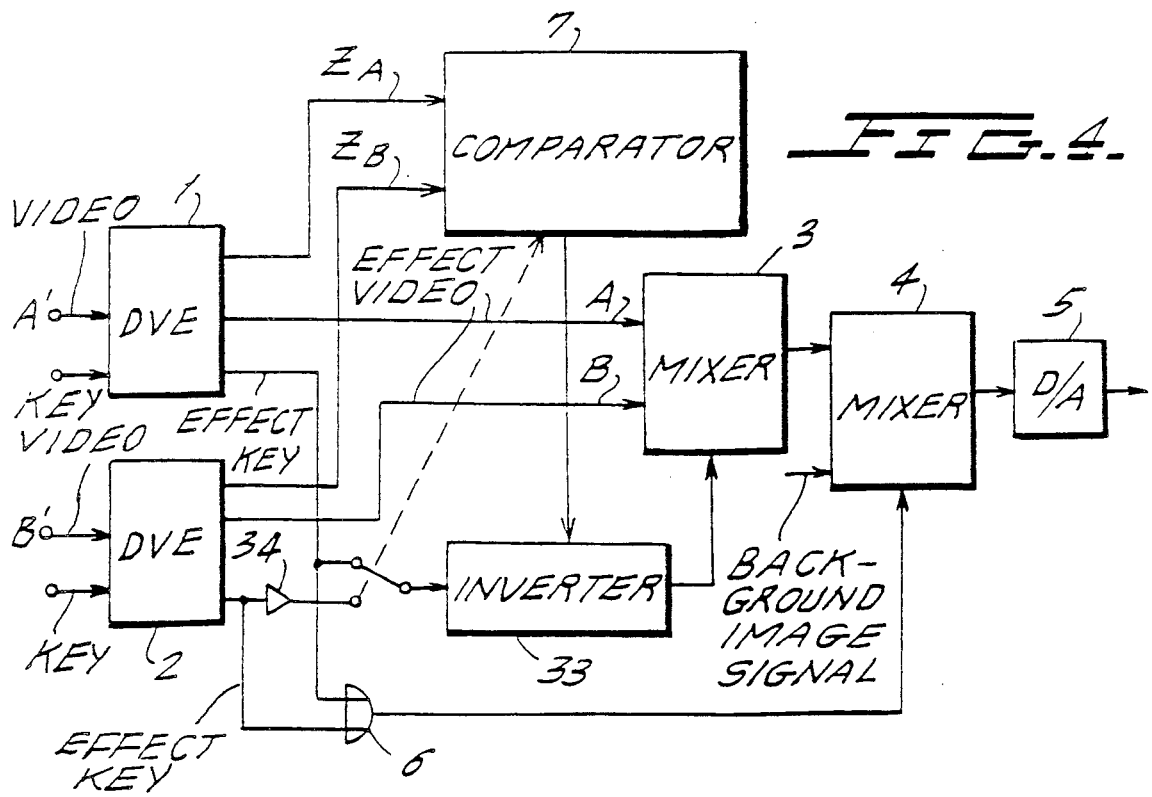
FIG. 4 is a block diagram illustrating a preferred embodiment of the present invention.

Referring to FIG. 4, two video signals having images A' and B' to be composed and key signals having waveforms corresponding to the two images A' and B' and being used for the subsequently executed signal-composition are supplied to two special effect apparatus (digital video effect apparatus) (DVE's) 1 and 2. The DVE's 1 and 2 transform the images A' and B' of the input video signals into desired effect shapes, for instance into the images A and B illustrated in FIGS. 1 (a) and (b) and, at the same time, transforms the key signals in the same manner with the input video signals to deliver effect key signals. Thus, the effect video signals are supplied to a mixer 3, in which a composed image to be displayed is formed, and the output of the mixer 3 is further composed with a background image signal by a background image mixer 4. The output of the mixer 4 is fed to a digital-to-analog (D/A) converter 5, where it is converted into an analog signal to be outputted.

The mixer 3 is basically controlled with the effect key signals extracted from the DVE's 1 and 2. Specifically, one or the other of the effect key signals from the DVE's 1 and 2 is selected by a switch 32 according to relative priorities, and supplied to the mixer 3 via an inverter 33. When the image A has the priority, the switch 32 is in a position as illustrated in the FIG. 4 to select the effect key signal of DVE 1. The inverter 33, though usually supplying the key signal from the switch 32 without inverting it to the mixer 3, inverts the polarities of the key signal at an overlapping part, only when the preset priority order becomes in conflict with a result of the depth comparison, i.e., when the image having priority becomes deeper than that of the other. To this end, depth (Z-direction) data $Z_A$ and $Z_B$ are taken out of the DVE's 1 and 2, and supplied to a comparator 7. The depth (Z-direction) data $Z_A$ and $Z_B$ will be described in more detail below.

The mixer 3 mixes the two input effect video signals with a mutually complementary gain ratio according to the level of the effect key signal from the inverting circuit 33 in order to compose them. Assuming that the effect key signal is a binary signal having "0" or "1"

states, when the effect key signal in the figure is "1", the image A is selected. When it is "0", the image B is selected. Accordingly, an inverter 34 is inserted on the path by which the switch 32 receives the effect key signal from the DVE 2. The mixer 3 in use here is well known in the art of video signal processing. When the switch 32 gives priority, as shown in FIG. 4, to the image A, the comparator 7 outputs an inverting signal if the depth data $Z_B$ is greater than the depth data $Z_A$ ($Z_B > Z_A$). Or, when the switch 32 gives the priority to the image B, it outputs an inverting signal if the data $Z_A$ is greater than the data $Z_B$ ($Z_A > Z_B$). Here, greater value in the depth data designates a shallower depth.

An OR circuit 6 outputs an OR output of the effect key signals supplied from the DVE's 1 and 2, and supplies it to the background image mixer 4. Thus, where the effect signal of the image A or B is to be displayed, the output of the mixer 3 is selected, and otherwise the background signal is selected.

Figure 5:
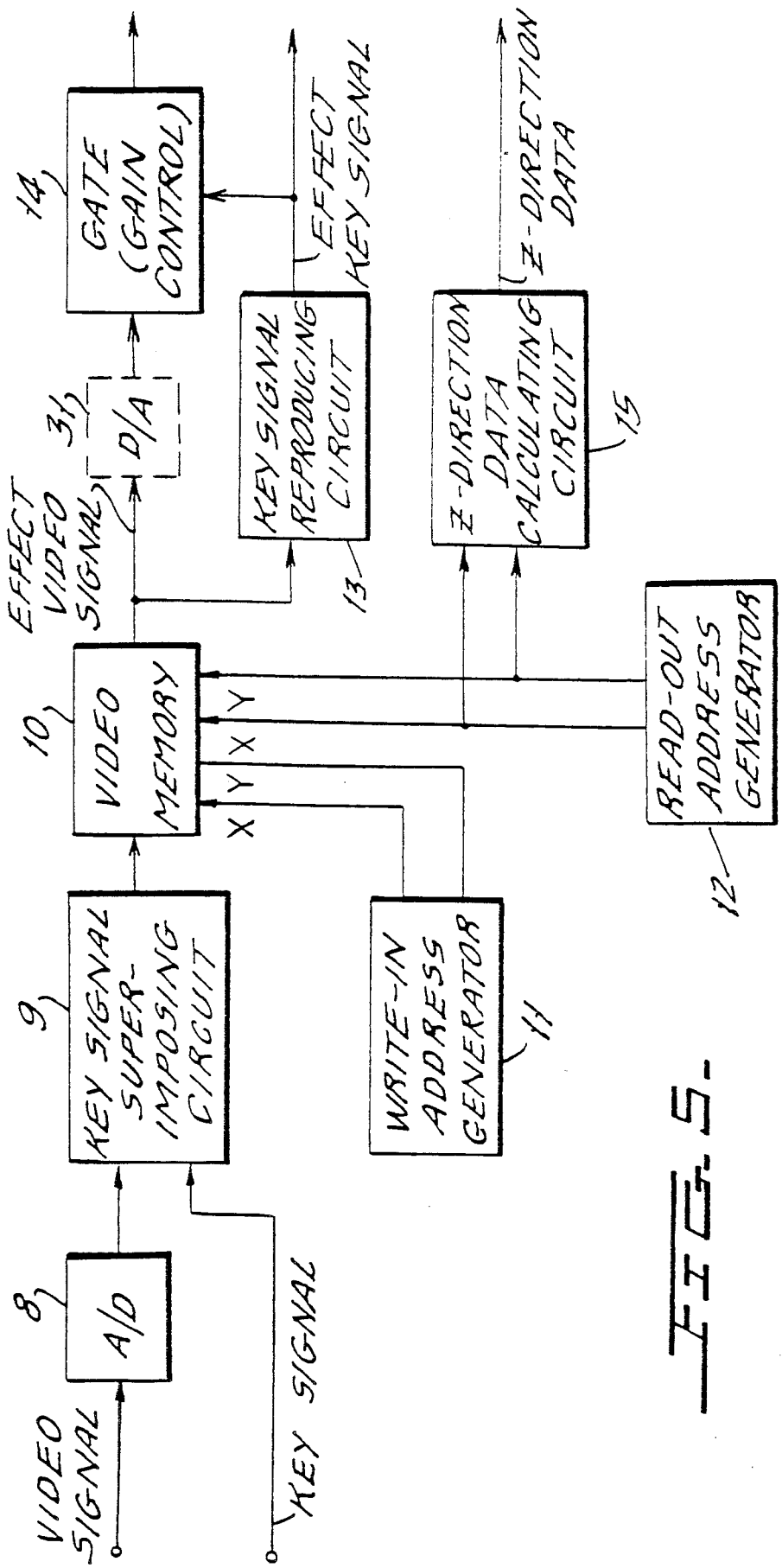
FIG. 5 is a block diagram illustrating the configuration of special effect apparatus contained in FIG. 4.

FIG. 5 illustrates a typical configuration of the DVEs 1 and 2 shown in FIG. 4. Each DVE comprises an analog-to-digital (A/D) converter 8, a key signal superimposing circuit 9 for superimposing a key signal onto a video signal, a video memory 10 for storing the video signal supplied from the superimposing circuit 9, a write-in address generator 11 for generating a write-in address for the video memory 10, a read-out address generator 12 for generating a special read-out address according to the special effect, a key signal reproducing circuit 13 for reproducing the key signal from the video signal read out of the memory 10, a gate circuit 14 for gating the read-out video signal from the memory 10 with the reproduced key signal, and a Z-direction data calculating circuit 15 responsive to the read-out address for calculating Z-direction data corresponding to the depth. The superimposition of the key signal is intended to gate the input video signal with the key signal, and its reproduction is achieved by determining the presence or absence of a signal level higher than a pedestal level. For details, reference may be made to U.S. Pat. No. 4,774,507, entitled "Special Video Effect System" which issued Sept. 27, 1988.

In the configuration shown in FIG. 5, the creation of a three-dimensional special effect corresponds to a process of coordinate transformation. In practice, such creation is accomplished by finding out which of the pixels on an output TV screen has been transformed from which of those on an input TV screen, and this is done by using the inverse matrix $M^{-1}$ of a 4×4 coordinate transformation matrix M. The transformation matrix M here is represented by the product of 4×4 transformation matrices $M_{size}$, $M_{move}$, $M_{rota}$ and $M_p$, respectively corresponding to expansion or compression, parallel shift, rotational and perspective transformation ($M = M_{size} \times M_{move} \times M_{rota} \times M_p$). Accordingly, the relationship between a pixel address (x, y) on the output TV screen and the corresponding pixel address (X, Y) on the original TV screen is as follows:

$$X = \frac{ax + by + c}{px + qy + k}$$

$$Y = \frac{dx + ey + f}{px + qy + k}$$

where a, b, c, d, e, f, p, q and k are constants obtained by developing the inverse matrix $M^{-1}$, and z is always zero. Such coordinate transformation is well known in the field of computer graphics, and is described for instance in William M. Newman, Robert F. Sproull, Principles of Interactive Computer Graphics, McGRAW-HILL, 1981.

Next will be described the depth (Z-direction) data calculation according to the present invention. The Z-direction (axis) data are calculated based on a three-dimensional matrix M' and the coordinates X and Y generated by the read-out address generator 12 as represented by the following equation.

$$Z = \frac{a'X + b'Y + c'}{p'X + q'Y + k'}$$

where the matrix M' is equal to the aforementioned coordinate transformation matrix M divided by a perspective transformation matrix $M_p$, and, thus, the relationship among the matrices M', M and $M_p$ can represented by $M' \times M_p = M$, and a', b', c', p', q' and k' are constants corresponding to the matrix M'.

Figure 6:
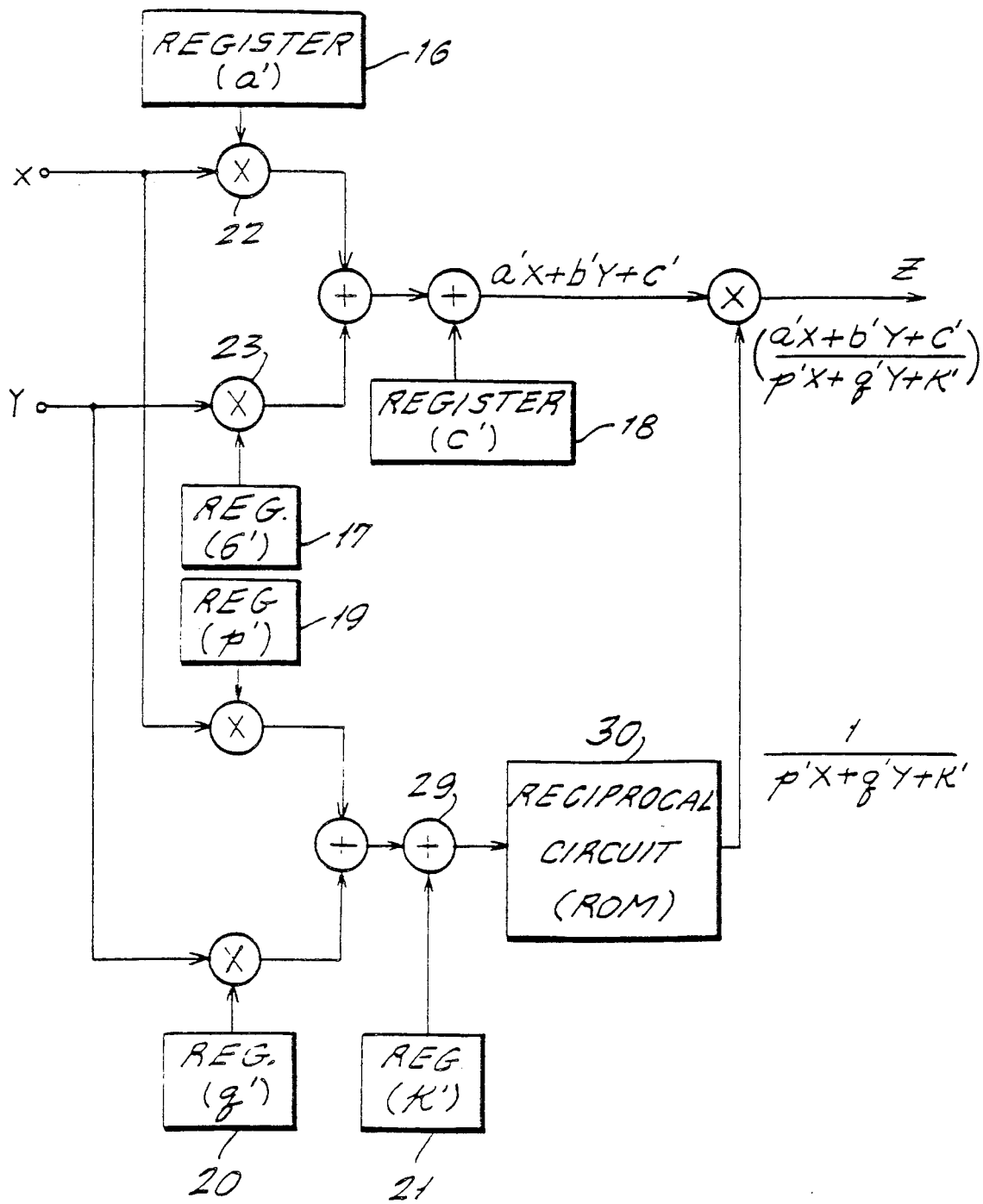
FIG. 6 is a block diagram illustrating the configuration of the depth data calculating circuit contained in FIG. 5.

FIG. 6 illustrates the configuration of the Z-direction data calculating circuit 15 of FIG. 5, wherein registers 17, 18, 19, 20 and 21 store the constants a', b', c', p', q' and k', respectively. Multipliers 22 and 23 calculate a'X and b'Y, respectively, and an adder 24 calculates (a'X+b'Y). Thereafter, an adder 24' calculates (a'X+b'Y+c'), and the sum is supplied to a multiplier 25. Multipliers 26 and 27 respectively calculate p'X and q'Y, and an adder 28 calculates (p'X+q'Y). An adder 29, which receives the constant k' from the register 21, calculates (p'X+q'Y+k'), and supplies the sum to a reciprocal circuit 30 consisting of a read-only memory. Accordingly 1/(p'X+q'Y+k') is obtained from the reciprocal circuit 30 and supplied to the multiplier 25, which produces (a'X+b'Y+c')/(p'X+q'Y+k').

In the preferred embodiment illustrated in FIG. 4, the mixer 3 and the background image mixer 4 handle digital signals. Therefore, the D/A converter 5 is arranged following them. However, in a configuration wherein the mixer 3 and the background image mixer 4 handle analog signals, a D/A converter 31 is inserted into the output stage of the video memory 10 and the D/A converter 5 in FIG. 4 is omitted.

Further, if the input key signal in the configuration of FIG. 5 is a multi-level signal, instead of the binary signal, the key signals as well as the video signals, are transformed. Therefore an A/D converter and a key memory are provided for the key signal transformation. On the other hand, the key signal superimposing circuit 9 and the key signal reproducing circuit 13 can be omitted. Since the effect key signals read out of the key memory would have multi-level information, a gain control circuit to control the output level according to the key signal level would be used in place of the gate circuit 14.

As hitherto described, according to the present invention, there is provided a video composing system which can create a highly accurate and visually natural composed video image by calculating Z-direction data in accordance with the read-out address of the video memory and by controlling image selection on the basis of the Z-direction data.

What is claimed is:

1. A video composing system, comprising:
   two special effect apparatus each including a video image memory for storing therein an input video signal, a write-in address generator for generating a write-in address for said video memory, a read-out address generator for generating a read-out address for said video memory according to special effects and to thereby produce a read-out video signal, and a depth data generator for calculating depth data according to said read-out address;

means for composing the read-out video signal obtained from said two special effect apparatus; and means responsive to a comparison of the depth data obtained from said special effect apparatus for generating a control signal to control said composing means, said control signal so functioning as to display, out of the images to be composed, the one having shallower depth data, wherein said special effect apparatus produces a three-dimensional special effect by controlling said read-out address including two dimensional X and Y coordinates, and said depth data Z are represented by:

$$Z = \frac{a'X + b'Y + c'}{p'X + q'Y + k'}$$

where a', b', c', p', q' and k' are constants.

2. A video composing system, comprising:

first and second special effect units each including a video image memory for storing a digital video signal, a write-in address generator for generating a write-in address for said memory, a read-out address generator for generating a read-out address for said video memory according to a desired special effect, a depth data calculator for calculating depth data on each pixel of an effect video signal read out of said video memory in response to said read-out address; and key signal generating means, corresponding to the effect video signal read out of said video memory, a key signal representing the position to be held by the effect video signal on the television screen;

a mixing means for mixing said effect video signals from said first and second special effect units in a mutually complementary ratio according to the level of a control signal;

a priority setting means for assigning priority to one of said effect video signals from said first and second special effect units by selecting one of the two key signals form said first and second special effect units as the control signal for said mixing means;

a comparator means for comparing the two depth data obtained from said first and second special effect units and supplying an inverted signal when the depth data for the video signal corresponding to the key signal selected by said priority setting switch is indicative of an image depth greater than an image depth associated with the non-selected key signal; and an inverting circuit for inverting the key signal selected by said priority setting means according to the inverted signal from said comparator means.

* * * * *